ARCHIBALD WIETING.
Improvement in Churns.
No. 124,304. Patented March 5, 1872.
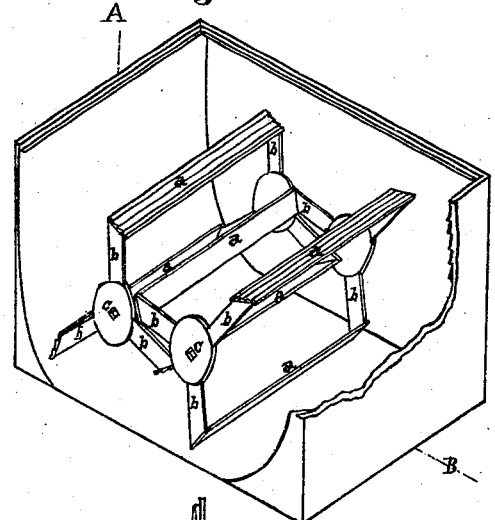
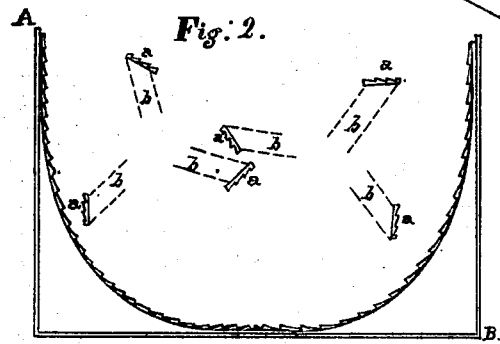
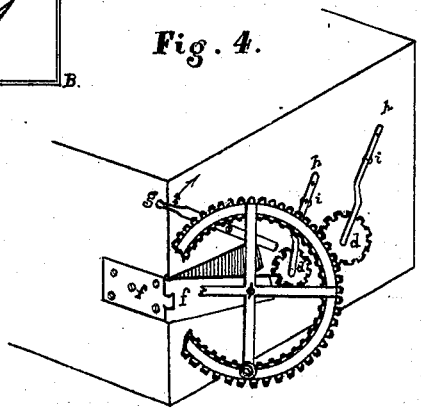

124,304

UNITED STATES PATENT OFFICE.

ARCHIBALD WIETING, OF FORT PLAIN, NEW YORK, ASSIGNOR TO ELIZABETH WIETING, OF SAME PLACE.

IMPROVEMENT IN CHURNS.

Specification forming part of Letters Patent No. 124,304, dated March 5, 1872.

SPECIFICATION.

Be it known that I, ARCHIBALD WIETING, of the town of Fort Plain, county of Montgomery, State of New York, have invented a new and Improved Churn for Churning Butter; and I declare the following to be a full, clear, and exact description of same, such as will enable others skilled in the art to which it pertains to make and use it, reference being had to the drawing and model forming part of this specification and accompanying this application.

My invention relates to certain improvements in double-dasher churns where the dashers are placed side by side and horizontal, and work into each other. My invention consists as follows: First, I propose to make both of the dashers similar, except that, operating in contrary directions, their parts are exactly reversed. I take three pieces of wood of equal or unequal length, with which I form two frames which are to form the two ends of a dasher. Between the corresponding arms, and extending across the churn, I place the beaters, which are strips of wood or metal. This frame-work is then made to revolve so that each beater will describe a horizontal cylinder; or, if either of the arms of the frame is longer than the other two, then the beaters extending between the ends of the shorter arms will describe a smaller but concentric cylinder. I propose, sometimes, to construct the dashers with four arms at right angles to each other, instead of with three arms, as above described. Two separate dashers being made as described they are suspended side by side so closely together that when revolving the beaters of one dasher will come alternately into the angle formed between two of the beaters of the other dasher, leaving just room enough for it to clear itself as it passes round. Both turning at the same time, this action becomes reciprocal, like the cogs of two wheels that work into each other. In attaching the beaters to the arms, I make the plane of each inclined to instead of parallel with the arms; and instead of making its beating-surface plane, I make it in such manner that a section by a plane perpendicular to the cylinder it describes will be a serrated line, presenting its abrupt planes normal to the current of cream that is thrown from the beaters of the other dasher. I also make the sides of the churn in such manner that its sectional line by this same plane will be a serrated one with its abrupt narrow planes presented to the current of cream. These serrated planes offer a resistance to the cream at every point, and serve to break the butter globules. I propose generally to use more than one beater on each corresponding set of arms, giving to that one which is nearer the axis of the dasher either the same or a different inclination with the arms. Second, I fix the dashers in place as follows: At the end opposite the power a simple pivot is placed at the junction of the arms. The other end is provided with a rectangular opening into which a mandrel, which passes through the side of the churn, is inserted. This mandrel is made rectangular at one end to fit into the receptacle in the end of the dasher; and on the other end is fixed a small cog-wheel. Both dashers are similarly fixed, and each cog-wheel and its mandrel is retained in its place by a spring, which, being attached to the outside of the churn, presses against the cog-wheel in the direction of its axis. To remove the dasher, you simply pull upon the cog-wheel in direction contrary to the action of the spring, which releases the mandrel from its seat and the dasher is free. Third, the power-crank, which gives contrary motion to the two small cog-wheels, is a large wheel with cogs on both the outside and inside of its periphery, and operating it turns one of the small cog-wheels with each set of cogs. The wheel that is run by the inner set of cogs may be made enough smaller than the outside one to compensate for the difference between the inside and outside circumferences of the power-crank, and the spring that holds this small cog and its mandrel in place is bent in and down so as to be out of the way of the power-wheel. In order that the inside cog-wheel may work freely the axle of the power-crank is attached to junction of two bars, which, crossing each other at right angles, are attached to the outside plane of the power-wheel. The other end of the axle is attached to one of the leaves of a hinge; and when the churn is in operation this leaf is kept rigid and flush with the side of the churn by closing into a recess and there retained by a lever-catch or button. When this lever is pressed aside and the hinge freed, the crank-wheel can be ungeared from the smaller cog-wheels, swung back out of the way, and the dashers removed. A handle is attached to the crank-wheel by which to turn it, and thus communicate motion to the dashers. These dashers, by their rapid action and the effect produced by their serrated planes and those of the sides of the churn keep the contents so agitated that the labor required to turn the crank is much reduced.

I do not limit myself as to the materials of which this churn and its several parts are made. I know that churns having two horizontal dashers have been made; therefore I do not claim such churns broadly. I propose sometimes to dispense with the hinge and lever-button.

In the drawing, Figure 1 is a view of the dashers as they are situated in the churn, with serrated beaters $a\ a$ inclined to arms $b\ b$, with mandrel hole $c$. Fig. 2 is a section on line A B of Fig. 1 showing the serrated planes of the beaters and sides of the churn. Fig. 3 is one of the small cog-wheels $d$ with its mandrel or pinion $e$. Fig. 4 is a view of the end of the churn showing the construction of the large crank-wheel so as not to interfere with the smallest cog-wheel; also, the hinge $f\ f$, which bears the crank-wheel, lever-button $g$, and small cog-wheels $d\ d$, provided with the springs $h\ h$, which may be released by turning them on the fastenings $i\ i$, so as to slide them off the cog-wheels.

Having thus described my invention, what I claim as new, and desire to secure by Letters Patent, is—

1. The churn herein described, having its inner surfaces serrated and provided with two horizontal dashers, with inclined serrated beaters $a\ a$, mandrel holes $c\ c$, cog-wheels $d\ d$, and mandrels $e\ e$, retaining springs $h\ h$, crank-wheel, and disengaging hinge $f\ f$, and lever-button $g$, all constructed and operating in the manner substantially as set forth.

2. The combination of the hinge device $f\ f$, carrying the double-geared crank-wheel, with the lever-button $g$, springs $h\ h$, stops $i\ i$, and removable pinions $d\ d$, whereby the dashers are made readily removable, substantially as specified.

ARCHIBALD WIETING.

Witnesses:
W. P. WEBSTER,
E. FOSTER.